United States Patent [19]

Tamm et al.

[11] Patent Number: 4,975,481

[45] Date of Patent: Dec. 4, 1990

[54] AQUEOUS CONTACT ADHESIVE CONTAINING EVA COPOLYMERS

[75] Inventors: Horst Tamm, Haan; Franz-Bernhard Knop, Monheim-Blee; Claus Kirchner, Duesseldorf, all of Fed. Rep. of Germany

[73] Assignee: Henkel Kommanditgesellschaft auf Aktien, Duesseldorf-Holthausen, Fed. Rep. of Germany

[21] Appl. No.: 266,453

[22] Filed: Nov. 2, 1988

[30] Foreign Application Priority Data

Nov. 5, 1987 [DE] Fed. Rep. of Germany ....... 3737630

[51] Int. Cl.$^5$ ................................................ C08K 5/10
[52] U.S. Cl. ..................................... 524/317; 524/503; 524/522; 524/524; 524/563
[58] Field of Search ............... 524/503, 317, 563, 524, 524/522

[56] References Cited

U.S. PATENT DOCUMENTS

| | | | |
|---|---|---|---|
| 3,746,679 | 7/1973 | Seipel, Jr. | 524/317 |
| 4,197,227 | 4/1980 | Zeliger | 524/563 X |
| 4,474,915 | 10/1984 | Grinacoff | 524/317 X |

FOREIGN PATENT DOCUMENTS 3244755  7/1984  Fed. Rep. of Germany .

*Primary Examiner*—Joseph L. Schofer
*Assistant Examiner*—J. M. Reddick
*Attorney, Agent, or Firm*—Ernest G. Szoke; Wayne C. Jaeschke; Daniel S. Ortiz

[57] ABSTRACT

An aqueous contact adhesive containing an aqueous dispersion of a water-immiscible solvent. The aqueous contact adhesive can contain additives such as preservatives, anti-oxidants, thickeners and thixotropicizing agents, emulsifiers and protective colloids. The contact adhesive has outstanding properties, particularly in regard to the absence of surface tackiness of substrate surfaces coated with the contact adhesive and a high initial tack of the substrate surfaces fitted together under pressure.

7 Claims, No Drawings

AQUEOUS CONTACT ADHESIVE CONTAINING EVA COPOLYMERS

BACKGROUND OF THE INVENTION

1. Field of the Invention

The invention is an aqueous contact adhesive based on EVA copolymers.

Contact adhesives are adhesives which are applied to both substrates to be bonded and, after a dried adhesive film has formed, the substrates are fitted together under pressure and a high strength bond is immediately formed.

Contact adhesives generally comprise synthetic rubbers, such as 2-chlorobutadiene polymers, and resins which are dissolved in organic solvents. In addition, they can contain other additives, such as stabilizers, viscosity regulators and the like. The occasionally high content of solvents and diluents (70 to 80%), which in some cases are toxic and/or readily inflammable, has prompted attempts to develop aqueous contact adhesives.

2. Statement of Related Art

Contact adhesives based on aqueous chlorobutadiene latices (chloroprene latices) do not produce the bond strengths obtainable with chloroprene-solvent contact adhesives. Acrylate copolymers used experimentally, in the form of aqueous dispersions, for contact adhesives show more of the character of pressure-sensitive adhesives and the phenomenon of "cold flow." The effect of cold flow, for example, permits a resistant covering of needle felt bonded around the nose of a projecting stair edge to gradually straighten.

Ethylene/vinyl acetate-based aqueous dispersions are known, having been proposed as a raw material for aqueous contact adhesives, for example in DE-OS No. 32 44 755. Although contact adhesives can be produced with these starting materials, they show only minimal bond strength or minimal adhesiveness for the materials to be bonded.

Water-borne contact adhesives hitherto formulated from commercially available raw materials show either inadequate adhesiveness or cohesion. What obviously matters is that, at the moment of bonding, i.e. when the materials coated with the adhesive are fitted together, the aqueous contact adhesive shows adhesiveness which diminishes after the bonding process and is supplanted by higher cohesiveness. The change from adhesive to cohesive phase must take place as quickly as in solvent-based contact adhesives.

BRIEF SUMMARY OF THE INVENTION

Other than in the operating examples, or where otherwise indicated, all numbers expressing quantities of ingredients or reaction conditions used herein are to be understood as modified in all instances by the term "about".

It has now been discovered that ethylene/vinyl acetate copolymer dispersions, which themselves show only minimal adhesiveness and initial tack, provide reversible adhesiveness when small quantities of solvents and resin tackifiers are added to the dispersions.

Accordingly, the present invention is an aqueous contact adhesive based on EVA copolymers which comprises:

(a) an aqueous dispersion of at least one EVA copolymer containing 23 to 27% by weight ethylene, having a solids content of 40 to 70% by weight, the EVA copolymer containing 0 to 3% by weight of another copolymer component;

(b) 2 to 15% by weight, based on EVA copolymer, of a tackifier resin and (c) 0.1 to 5% by weight of a water-immiscible solvent based on the total weight of the dispersion, (d) 0.1 to 10% by weight of the standard additives, such as preservatives, anti-oxidants, thickeners and thixotropicizing agents and also emulsifiers and protective colloids.

DETAIL DESCRIPTION OF THE INVENTION

The EVA copolymers useful in the practice of the invention having an ethylene content of 23 to 27% by weight are commercially available. Where they have been proposed for use as contact adhesives, however, the formulations either contain no tackifier resins, no water-immiscible solvents and/or an excessive content of terpolymer components. When the ethylene content in the EVA copolymers is low, unsatisfactory contact tackiness is obtained. When the ethylene content is high, a surface-tacky adhesive film is obtained after drying, i.e. after film formation, and the bonding shows the phenomenon of cold flow.

The tackifiers useful in the aqueous contact adhesives of the invention are the resins generally used for PVAc and EVA adhesives, particularly natural balsam resins, derivatives thereof, for example dimerized, disproportionated and hydrogenated resins, glycerol and pentaerythritol esters of balsam resins and their abovementioned derivatives, tall oil resins, derivatives thereof analogous to the balsam resin derivatives discussed above, hydrocarbon resins, polyterpene resins, coumarone-indene resins and the like.

Suitable water-immiscible solvents are solvents for the EVA polymers which readily migrate from the set adhesive film. Particularly useful solvents are aromatic hydrocarbons, chlorinated hydrocarbons and esters. For example, xylene or a 70% solution of balsam resin in xylene provides a marked increase in adhesiveness of the EVA dispersions used in the practice of the invention. It is known that addition of solvents or resin solutions improve the adhesiveness of nonaqueous adhesives, so that many adhesives, for example adhesives for the industrial production of packaging materials, contain small or relatively large additions of organic solvents to accelerate setting; floor-covering adhesives, for example, contain solutions of natural resins in aromatic hydrocarbons to improve wet initial strength, i.e. tack. The packaging and floor-covering adhesives are not contact adhesives and are not concerned with the reversible increase in adhesiveness in a, basically, highly cohesive polymer suitable for contact adhesives.

The aqueous contact adhesives of the invention may additionally contain standard additives, such as preservatives, antioxidants, thickeners, thixotropic agents, emulsifiers and protective colloids. Suitable emulsifiers and protective colloids are the substances normally used to prepare dispersions, for example surfactants, polyvinyl alcohol, cellulose derivatives and the like.

In a preferred embodiment of the invention, the aqueous contact adhesives of the invention contain up to 5% by weight and more especially up to 3% by weight of inorganic pigments and/or less than 1% by weight of organic pigments, based in either case on the total weight of the contact adhesives. These limits are particularly important in the case of inorganic pigments which, at the same time, also serve as fillers, for example titanium white and carbon black. Relatively large quantities of fillers are not beneficial to the contact adhesives of the invention and are therefore not recommended.

In another preferred embodiment of the invention, the particle size of the EVA copolymers in the dispersion is from 0.3 to 5 micrometers and the solids content of the dispersion from 50 to 65% by weight.

In another preferred embodiment of the invention, the aqueous contact adhesives contain, as the water-immiscible solvents, solvents selected from the group consisting of acetic acid-(3-methoxy-n-butyl)-ester and glycolic acid-n-butyl ester. As far as is known at the present time, these solvents are not hazardous materials and do not give off unpleasant odors. They are preferably used in quantities of 1 to 5% by weight, based on the total weight of the dispersion.

In another preferred embodiment of the invention, the resins to be added to the aqueous contact adhesive dispersion have a melting point of at least 60° C. The desired surface film is thus obtained without any surface tackiness. The terpolymer components optionally present in the EVA polymers are preferably selected from the group consisting of crotonic acid and N-methylol acrylamide.

The present invention also relates to a process for the production of an aqueous contact adhesive in which the resin is added to the dispersion in the form of a solution or in the form of a melt. However, it is preferred to introduce the resin and the water-immiscible solvent separately or together into the aqueous dispersion of the EVA copolymer heated to a temperature above the melting point of the resin, either separately or together with the other additives. By this procedure, better results are obtained in regard to adhesiveness of the contact adhesive by addition of smaller quantities of solvent or tackifier resin. In addition, where solvents, tackifier resins and heat are used in combination, highly cohesive (more especially crystallized) regions in highly cohesive polymers are "broken up."

The quantity of tackifier resin added to the EVA polymer preferably comprises from 5 to 10%. Where low-melting resins (melting point or softening points of the resin or resin mixtures are below 60° C.) are added, the quantity added should be at the lower end of the recommended range, i.e. from 2 to 5%.

The present invention also relates to the use of EVA copolymers containing 23 to 27% by weight ethylene in the form of aqueous dispersions having a solids content of from 40 to 70% by weight and more especially from 50 to 65% by weight, the EVA copolymers optionally contain up to 3% by weight of another copolymer component, for the formation of coatings on substrates.

It has been found that substrate coatings thus precoated can be regenerated by contact with freshly applied contact adhesive according to the invention. For example, it is possible to press precoated floor coverings onto contact adhesive applied to the floor substrate to obtain good contact adhesion. The invention is illustrated by the following Examples and Comparison Examples.

EXAMPLE 1

8.6 parts by weight of a 70% solution of a non-crystallizing Portuguese balsam resin (softening point 70° to 80° C., acid value 162–175) in xylene were added with stirring to 100 parts by weight of an EVA dispersion having a solids content of 60%, particle size medium-disperse (0.3 to 5 micrometers), pH value 4 to 5, viscosity (Brookfield RVT 20° C., spindle 5, 20 r.p.m.) approx. 6,000 mPa.s, ethylene/vinyl acetate ratio approx. 25/75% by weight. In addition, 0.03 part by weight 1,2-benzoisothiazolin-2-one as preservative and 0.20 part by weight hydroxypropyl guar as thickener and also 2.7 parts by weight xylene were added to the adhesive, based on the starting dispersion.

An easy-to-apply, clear-drying contact adhesive having the following specification was obtained:
solids content: approx. 60%
viscosity (Brookfield, spindle 5, 10 r.p.m.): 34,000 mPa.s
airing time: approx. 30 minutes (as measured at 23° C./55% relative humidity on a compact substrate)
application by toothed spatula: 200–300 g/m$^2$ (TKB A3 toothed spatula, with tooth spaces 1.5 mm wide and 1.65 mm deep and tooth bridges 0.5 mm wide).

EXAMPLE 2

2 parts by weight 3-methoxy-n-butyl acetate were added to 100 parts by weight of the EVA dispersion of Example 1 and the mixture heated to approximately 60° C. A resin melt heated to about 80° C. and consisting of 2 parts by weight of a resin derivative liquid at room temperature (plasticized resin; tall oil resin triethylene glycol ester) and 3 parts by weight of the same balsam resin as in Example 1 were then added to the mixture with continuous stirring. The mixture was preserved by addition of 0.03 part by weight 1,2-benzoisothiazolin-2-one.

An easy-to-apply, clear-drying contact adhesive having the following specification was obtained:
pH value: 4.2
solids content: approx. 60%
viscosity: 14,000 mPa.s (Brookfield, spindle 5, 5 r.p.m.)
airing time: approx. 30 mins. (as measured at 23° C./55% relative humidity, compact substrate), toothed spatula application 220 g/m$^2$, A3 toothed spatula (as in Example 1).

COMPARISON EXAMPLE 1

The EVA dispersion of Example 1 was used directly as a contact adhesive.

COMPARISON EXAMPLE 2

An adhesive was prepared according to the same formulation as in Example 1, but using an EVA copolymer having the following specification:
glass transition temperature: +5° C.
particle diameter: 0.5 to 2.0 micrometers
viscosity: approx. 4,500 mPa.s (Brookfield, spindle 5, 20 r.p.m.)
pH value: approx. 3.5
solids content: 55%
ethylene content: approx. 20%.

A clear-drying adhesive having the following specification was obtained:
pH value: approx. 4.5
solids content: approx. 55%
viscosity: 336,000 mPa.s (Brookfield, spindle 5, 1 r.p.m.)
airing time: approx. 30 mins. (as measured at 23° C./55% relative humidity), compact substrate, toothed spatula application 230 g/m$^2$, A3 toothed spatula (as in Example 1).

COMPARISON EXAMPLE 3

An adhesive was prepared according to the same formulation as in Example 1, but using an EVA dispersion having the following specification:
glass transition temperature: −28° C.
particle diameter: 0.5 to 2.0 micrometers
viscosity: approx. 5,000 mPa.s (Brookfield, spindle 5, 20 r.p.m.)
pH value: approx. 3.5
solids content: approx. 55%
ethylene content: approx. 30%

A clear-drying adhesive having the following specification was obtained:
pH value: approx. 5
solids content: 55%
viscosity: 60,400 mPa.s (Brookfield, spindle 5, 5 r.p.m.)
airing time: approx. 30 mins. (as measured at 20° C./55% relative humidity), compact substrate, toothed spatula application 170 g/m², A3 toothed spatula (as in Example 1).

The formulations were tested according to the following criteria:

1. Initial tack was determined by measurement of the peel strength (DIN 53 278) 5 minutes after joining of the substrates.
2. Ultimate bond strength was determined by measurement of shear strength and peel strength after storage for 14 days at room temperature (DIN 53 277, DIN 53 278).
3. Plasticizer stability was determined by measurement of the peel strength of bonded PVC stored for 7 days at room temperature, for 5 days at 70° C. and for 2 days at room temperature (DIN 16 850). Surface tackiness was qualitatively tested.

The unacceptable cold flow of contact adhesives was tested by the long-term shear test (Nord test 1: bonding of a 3 cm ×10 cm strip of PVC covering to a vertically arranged asbestos-cement sheet; load: 2 kg for 4 days at ambient temperature, then a total of 4 kg for another 4 days and finally a total of 6 kg for another 4 days; a bond should not separate; an adhesive showing the property of cold flow does not withstand the long-term shear test).

The results obtained are shown in Table 1. As the test results show, the aqueous contact adhesives according to Examples 1 and 2 show excellent properties. By contrast, Comparison Example 1 fails to give any good adhesion values whatever; the adhesive values of Comparison Example 2 are distinctly poorer than those of Examples 1 and 2. The formulation of Comparison Example 3, which contains more than 30% ethylene in the copolymer used, gives surface-tacky products.

|  | Example | | Comparison Example | | |
|---|---|---|---|---|---|
| Adhesive | 1 | 2 | 1 | 2 | 3 |
| Airing time (mins.) | 100 | 100 | 100 | 100 | 100 |
| Peel strength 5 mins. after joining - N/cm² | 19 | 10.4 | 3.0 | 2.8 | 2.8 |
| Shear strength after 14 days at RT N/cm² (PVC to beechwood 50 mm/min) | 28.5 | 28.0 | 28.0 | 28.0 | 14.0 |
| Peel strength after 14 days at RT N/cm² | 22 | 14.5 | 5.8 | 10.5 | 14.0 |
| Plasticizer stability 14 days 70° C. | 32 | 21.8 | 9.4 | 16.2 | 12.8 |
| Surface tackiness | None | None | None | None | Serious |
| Long-term shear test | + | + | (+) | + | − |

+: passed
(+): not passed by all test specimens
−: not passed by any test specimen

We claim:
1. An aqueous contact adhesive containing EVA copolymers, which comprises:
    (a) an aqueous dispersion of at least one EVA copolymer containing 23 to 27% by weight ethylene, monomeric units, and 0 to about 3% by weight of at least one additional monomeric unit, having a solids content of from about 40 to 70% by weight;
    (b) about 2 to about 15% by weight, based on EVA copolymer, of at least one tackifier resin;
    (c) from about 0.1 to about 5.0% by weight, based on the total weight of the dispersion, of at least one water-immiscible solvent for the copolymer which migrates from the set adhesive film; and
    (d) from about 0.1 to about 10% by weight of the contact adhesive of at least one additive.
2. An aqueous contact adhesive of claim 1, wherein the additive comprises up to about 5% by weight of inorganic pigments.
3. An aqueous contact adhesive of claim 1 wherein the particle size of the EVA copolymer in the dispersion is from about 0.3 to about 5 micrometers.
4. An aqueous contact adhesive of claim 1 wherein the solids content of the EVA dispersion is from about 50 to about 65% by weight.
5. An aqueous contact adhesive of claim 1 wherein the at least one water-immiscible solvent is selected from the group consisting of acetic acid-(3-methoxy-n-butyl)-ester and glycolic acid-n-butyl ester.
6. An aqueous contact adhesive of claim 1 wherein the at least one tackifier resin has a melting point of at least about 60 ° C.
7. An aqueous contact adhesive of claim 1 wherein the at least one additional monomeric unit is selected from the group consisting of crotonic acid and N-methylol acrylamide.

* * * * *